United States Patent
Chhabra et al.

(10) Patent No.: US 10,838,773 B2
(45) Date of Patent: Nov. 17, 2020

(54) TECHNIQUES FOR DYNAMIC RESOURCE ALLOCATION AMONG CRYPTOGRAPHIC DOMAINS

(71) Applicant: INTEL CORPORATION, Santa Clara, CA (US)

(72) Inventors: Siddhartha Chhabra, Portland, OR (US); David M. Durham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 224 days.

(21) Appl. No.: 15/942,029

(22) Filed: Mar. 30, 2018

(65) Prior Publication Data
US 2019/0042324 A1    Feb. 7, 2019

(51) Int. Cl.
| | |
|---|---|
| G06F 9/46 | (2006.01) |
| G06F 9/50 | (2006.01) |
| G06F 12/0808 | (2016.01) |
| G06F 12/14 | (2006.01) |
| H04L 9/32 | (2006.01) |
| G06F 9/455 | (2018.01) |
| G06F 12/084 | (2016.01) |
| G06F 21/79 | (2013.01) |
| G06F 21/62 | (2013.01) |

(52) U.S. Cl.
CPC ........ *G06F 9/5077* (2013.01); *G06F 9/45558* (2013.01); *G06F 9/5016* (2013.01); *G06F 12/084* (2013.01); *G06F 12/0808* (2013.01); *G06F 12/1408* (2013.01); *G06F 21/6281* (2013.01); *G06F 21/79* (2013.01); *H04L 9/3242* (2013.01); *G06F 2009/45583* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 9,258,113 B2 * | 2/2016 | Schneider | H04L 9/3271 |
| 9,323,677 B2 * | 4/2016 | Dube | G06F 12/084 |

(Continued)

FOREIGN PATENT DOCUMENTS

| | | |
|---|---|---|
| WO | 2011078855 A1 | 6/2011 |

OTHER PUBLICATIONS

Liu et al. "CATalyst: Defeating Last-Level Cache Side Channel Attacks in Cloud Computing" IEEE 2016 (Liu_2016.pdf; pp. 1-13) (Year: 2016).*

(Continued)

*Primary Examiner* — Hiren P Patel

(57) ABSTRACT

Various embodiments are generally directed to techniques for dynamic resource allocation among cryptographic domains, such as with memory pages in a platform that implements a plurality of cryptographically isolated domains, for instance. Some embodiments are particularly directed to a platform that includes a resource allocation manager (RMGR) that allows for page reassignment among cryptographically isolated virtual machines (VMs) while ensuring functional correctness with respect to integrity. In many embodiments, the RMGR may include hardware and/or software support for a new instruction that enables efficient key reassignment for memory pages.

24 Claims, 14 Drawing Sheets

(56) References Cited

U.S. PATENT DOCUMENTS

| | | | |
|---|---|---|---|
| 9,607,177 B2* | 3/2017 | Jejurikar | G06F 21/78 |
| 9,619,662 B1* | 4/2017 | Beda, III | H04L 63/00 |
| 10,163,510 B1* | 12/2018 | Giles | G11C 14/0045 |
| 10,192,047 B2* | 1/2019 | Penzin | G06F 21/44 |
| 10,303,899 B2* | 5/2019 | Durham | G06F 8/63 |
| 10,474,359 B1* | 11/2019 | Volpe | G06F 3/0622 |
| 10,585,809 B2* | 3/2020 | Durham | G06F 21/64 |
| 2007/0130470 A1* | 6/2007 | Blom | G06F 21/64 |
| | | | 713/181 |
| 2008/0077767 A1* | 3/2008 | Khosravi | G06F 12/1408 |
| | | | 711/216 |
| 2012/0079283 A1* | 3/2012 | Hashimoto | G06F 12/1425 |
| | | | 713/189 |
| 2012/0275328 A1* | 11/2012 | Iwata | H04L 12/4666 |
| | | | 370/252 |
| 2014/0032761 A1 | 1/2014 | Beveridge | |
| 2014/0201462 A1* | 7/2014 | Maharana | G06F 12/0895 |
| | | | 711/142 |
| 2014/0208109 A1* | 7/2014 | Narendra Trivedi | |
| | | | H04L 9/0643 |
| | | | 713/170 |
| 2014/0223197 A1* | 8/2014 | Gueron | G06F 21/72 |
| | | | 713/193 |
| 2014/0245297 A1 | 8/2014 | Hackett et al. | |
| 2015/0095662 A1 | 4/2015 | Jejurikar et al. | |
| 2015/0248357 A1 | 9/2015 | Kaplan et al. | |
| 2015/0370727 A1* | 12/2015 | Hashimoto | G06F 12/145 |
| | | | 711/163 |
| 2015/0370728 A1* | 12/2015 | Yamada | G06F 21/64 |
| | | | 711/163 |
| 2016/0085695 A1* | 3/2016 | Leslie-Hurd | G06F 12/1441 |
| | | | 711/163 |
| 2016/0110291 A1* | 4/2016 | Gordon | G06F 12/126 |
| | | | 711/6 |
| 2016/0179667 A1* | 6/2016 | Kumar | G06F 12/0804 |
| | | | 711/135 |
| 2016/0267024 A1* | 9/2016 | Bowler | G06F 21/78 |
| 2016/0285892 A1* | 9/2016 | Kishinevsky | G06F 12/1408 |
| 2016/0378687 A1* | 12/2016 | Durham | G06F 12/1408 |
| | | | 713/193 |
| 2016/0378701 A1* | 12/2016 | Niell | G06F 13/28 |
| | | | 710/308 |
| 2017/0004001 A1 | 1/2017 | Bacher et al. | |
| 2017/0024573 A1* | 1/2017 | Bhattacharyya | G06F 21/64 |
| 2017/0031719 A1* | 2/2017 | Clark | G06F 9/5016 |
| 2017/0091487 A1 | 3/2017 | Lemay | |
| 2017/0285976 A1 | 10/2017 | Durham et al. | |
| 2017/0344298 A1* | 11/2017 | Shih | G06F 9/45558 |
| 2019/0182040 A1* | 6/2019 | Hunt | G06F 9/45558 |

OTHER PUBLICATIONS

European Search Report for the European Patent Application No. EP19159851, dated Aug. 20, 2019, 8 pages.

International Search Report and Written Opinion for the International Patent Application No. PCT/US2019/019895, dated Jun. 12, 2019, 11 pages.

* cited by examiner

Identify a first key identifier associated with a first virtual machine (VM), a second key identifier associated with a second VM, and an address of a memory page allocated to the first VM
602

Invalidate a cache line associated with the first VM based on the first key identifier
604

Generate a message authentication code (MAC) for each cache line comprising the memory page based on the second key identifier
606

Allocate the memory page to the second VM
608

*FIG. 7*

Storage Medium 700

*Computer Executable Instructions for 400*

*Computer Executable Instructions for 500*

*Computer Executable Instructions for 600*

*900*

TECHNIQUES FOR DYNAMIC RESOURCE ALLOCATION AMONG CRYPTOGRAPHIC DOMAINS

BACKGROUND

Cryptography may refer to the practice and study of techniques for secure communication in the presence of third parties. More generally, cryptography is about constructing and analyzing protocols that prevent third parties from reading confidential data. In application, cryptography can involve one or more of encryption and decryption. Encryption can be the process of converting ordinary information, referred to as plaintext, into an unintelligible sequence of symbols, referred to as ciphertext, and decryption can be the process of converting ciphertext back to plaintext. Typically, a cipher system may include a pair of algorithms that convert data back and forth between plaintext and ciphertext. In various embodiments, cipher systems may use keys to convert between plaintext and ciphertext.

BRIEF DESCRIPTION OF THE DRAWINGS

FIG. 6 illustrates an embodiment of a third logic flow.

FIG. 7 illustrates an embodiment of a storage medium.

DETAILED DESCRIPTION

Figure 1A:
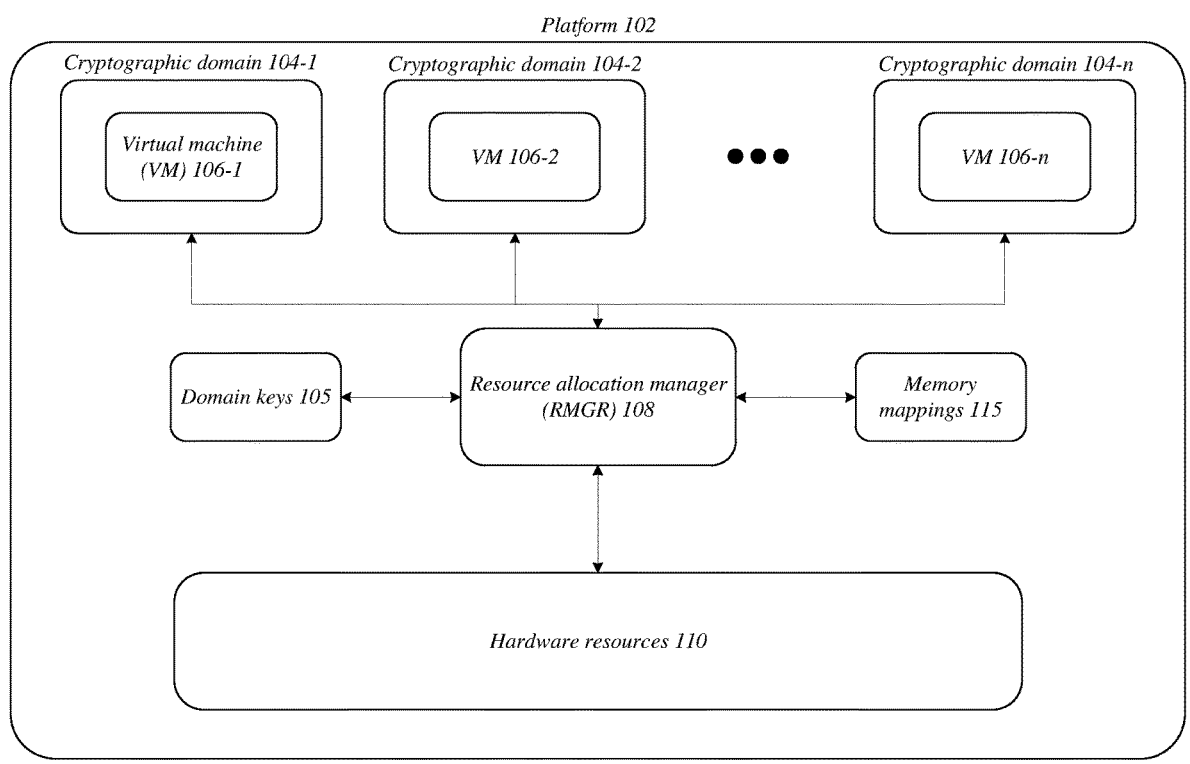
FIG. 1A and FIG. 1B illustrate an embodiment of a platform with multiple cryptographic domains.

Various embodiments are generally directed to techniques for dynamic resource allocation among cryptographic domains, such as with memory pages in a platform that implements a plurality of cryptographically isolated domains, for instance. Some embodiments are particularly directed to a platform that includes a resource allocation manager (RMGR) that allows for page reassignment among cryptographically isolated virtual machines (VMs) while ensuring functional correctness with respect to integrity. In many embodiments, the RMGR may include hardware and/or software support for a new instruction that enables efficient key reassignment for memory pages. In some embodiments, the RMGR may be included in or implemented by a virtual machine monitor (VMM). In one embodiment, for example, an apparatus for resource allocation management may comprise logic with at least a portion of the logic implemented in circuitry. In various embodiments, the logic may identify a first key identifier associated with a first VM, and second key identifier associated with a second VM, and an address of a memory page allocated to the first VM. In various such embodiments, the logic may invalidate a cache line associated with the first VM based on the first key identifier. In some embodiments, the logic may generate a message authentication code (MAC) for the memory page based on the second key identifier. In various embodiments, a MAC may be associated with each cache line on the page. In many embodiments, the logic may allocate the memory page to the second VM. These and other embodiments are described and claimed.

Some challenges facing resource allocation include the inability or use of excessively complex, bulky, and inefficient techniques to reallocate resources from a first cryptographic domain to a second cryptographic domain. These challenges may result from the need to be able to reassign physical memory pages to meet memory demands of a workload or the need to switch allocation of a physical memory page from one workload to another workload, such as when the workload exits. For instance, cloud service providers may need to provide cryptographic isolation for different customer workloads running on a platform. Typically, a page reassignment between domains involves a key reassignment. Some systems, to avoid information leaks and avoid corruption of data, must follow a high-performance overhead flow on key reassignment. For example, this may include flushing or invalidating cache lines associated with the previous key assignment from a cache hierarchy and writing all zeroes to the page with the new key. Additionally, systems may only be able to perform flushes or invalidations at impractical granularities. This may involve having to flush cache lines individually (e.g., with CLFLUSH) or writing-back and invalidating all modified lines in a cache hierarchy (e.g., with WBINVD), resulting in excessive performance overhead. Therefore, in some instances, each key reassignment for a 4 kilobyte (KB) page may involve 64 cache line flush operations and 64 write operations.

Adding further complexity, ensuring integrity for each domain may lead to functional problems with respect to key reassignment. For instance, to reassign a page from a first workload using a first key to a second workload using a second key may require that the integrity values (e.g., MACs) associated with the page are reinitialized with the second key to avoid integrity failures. However, a write to memory attempting to update the integrity values, such as by zeroing out the page with the second key, can first result in a read for ownership. The read for ownership, using the second key, can fetch a cache line and the associated integrity values that were generated with the first key. This can lead to a verification failure because integrity values generated with the first key cannot be verified with the second key. These and other factors may result in resource allocation with deficient performance and an inability to ensure integrity between different cryptographic domains (also referred to simply as domains). Such limitations can drastically reduce the capabilities, usability, and applicability of platforms that support multiple cryptographic domains, contributing to inefficient systems with limited capabilities.

Various embodiments described herein include a platform that includes a resource allocation manager (RMGR) that allows for page reassignment among different domains, such as cryptographically isolated virtual machines (VMs), while ensuring functional correctness with respect to integrity. In many embodiments, the RMGR may include hardware support for a new instruction, referred to as PGINVDREMAP, that enables efficient key reassignment for memory pages being reallocated from a first domain to a second domain. In many such embodiments, the RMGR may include and/or utilize software support to implement PGINVDREMAP.

In one or more embodiments, PGINVDREMAP may operate at a preferred granularity, such as a page granularity. In one or more such embodiments, PGINVDREMAP may cause non-temporal writes to occur at the preferred granularity. In various embodiments, a non-temporal write may include or refer to a write without a preceding memory read, such as a write-for-ownership or direct store. In some embodiments, PGINVDREMAP may invalidate all cache lines associated with a page using an old key associated with the domain the page is being reassigned from. In various embodiments, PGINVDREMAP may also reinitialize integrity values (e.g., MACs) using a new key associated with the domain the page is being reassigned to. In various such embodiments, reinitialization of the integrity values may prevent integrity failures when the page is reassigned and used with the new key. In many embodiments, non-temporal writes may be used for reinitializing integrity values to enable integrity support for VM isolation. In these and other ways the RMGR may enable quick and efficient resource allocation/reallocation to achieve improved performance with reduced overhead, resulting in several technical effects and advantages. For example, the technical effects and advantages may include previously unattainable performance and/or security guarantees, such as with respect to VM isolation.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Figure 1B:
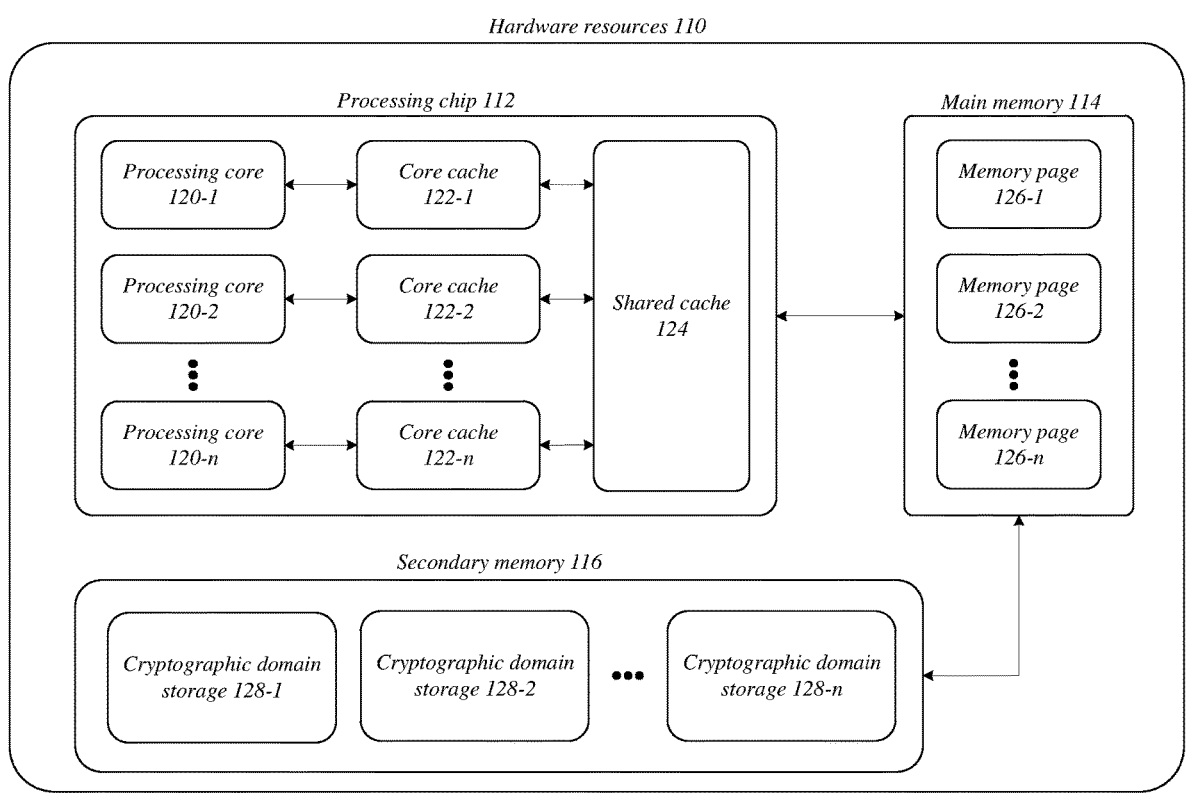

FIG. 1A and FIG. 1B illustrates an example of an operating environment 100 that may be representative of various embodiments. Operating environment 100 may include a platform 102. In operating environment 100, platform 102 may selectively implement one or more virtual machines (VMs) 106-1, 106-2, 106-3 in respective cryptographic domains 104-1, 104-2, 104-$n$. In some embodiments, multiple VMs maybe implemented within a cryptographic domain. In many embodiments, different cryptographic domains may be provided to different customers of a provider, such as a cloud service provider. In one or more embodiments described herein, resource allocation manager (RMGR) 108 may dynamically allocate/reallocate one or more hardware resources 110 among the domains 104 while maintaining confidentiality and/or integrity between cryptographic domains 104. In one or more such embodiments, resource allocation may depend on a workload placed on respective VMs 106 in the cryptographic domains 104, such as by a customer associated with the corresponding cryptographic domain. In various embodiments, each cryptographic domain 104 may correspond to a unique one or set of domain keys 105. For example, hardware resources 110 may include memory that is encrypted/decrypted with a domain key that corresponds to the cryptographic domain that the memory has been allocated to. In many embodiments, RMGR 108 may update memory mappings 115 as part of allocating or reallocating one or more of the hardware resources 110. In some embodiments, RMGR 108 may be implemented by or comprised in a virtual machine monitor (VMM). Embodiments are not limited in this context.

As illustrated in FIG. 1B, hardware resources 110 may include processing chip 112, main memory 114, and secondary memory 116. In various embodiments, processing chip 112 may include processing cores 120-1, 120-2, 120-$n$ with respective core caches 122-1, 122-2, 122-$n$ and a shared cache 124. In various such embodiments, the core caches 122 may be above the shared cache 124 in a cache hierarchy of the platform 102. In many embodiments, main memory 114 may include memory pages 126-1, 126-2, 126-$n$ which can each be dynamically allocated/reallocated among cryptographic domains 104, such as by RMGR 108. For example, RMGR 108 may allocate memory page 126-1 to domain 104-1 for use by VM 106-1, memory page 126-2 to domain 104-2 for use by VM 106-2, and memory page 126-$n$ to domain 104-$n$ for use by VM 106-$n$. In one or more embodiments, main memory 114 may include random access memory. In some embodiments, the memory pages may be allocated/reallocated to specific VMs within the cryptographic domains. For instance, in various embodiments, multiple VMs may be instantiated in a cryptographic domain, and separate memory pages may be allocated to each VM.

In various embodiments, secondary memory 116 may include cryptographic domain storages 128-1, 128-2, 128-$n$. In various such embodiments, each of the cryptographic domain storages 128 in secondary memory 116 may correspond to one of cryptographic domains 104. For example, cryptographic domain storage 128-1 may correspond to cryptographic domain 104-1, cryptographic domain storage 128-2 may correspond to cryptographic domain 104-2, and cryptographic domain storage 128-$n$ may correspond to cryptographic domain 104-$n$. In such examples, each of the cryptographic domains storages 128 may be encrypted/ decrypted with a corresponding domain key of domain keys 105. In some embodiments, secondary memory 116 may include disk memory.

In one or more embodiments described herein, reallocating a memory page from a first domain to a second domain may include one or more of the following operations described with respect to reallocating memory page 126-n from cryptographic domain 104-1 associated with a first key in domain keys 105 to cryptographic domain 104-2 associated with a second key in domain keys 105. In some embodiments, the memory page 126-n may be made inaccessible to components of cryptographic domain 104-1 including VM 106-1. For example, RMGR 108 may invalidate all page mappings associated with memory page 126-n in memory mappings 115. In various embodiments, the contents of memory page 126-n may be read and saved to a cryptographic domain storage 128-1 in secondary memory 116. In various such embodiments, the contents of memory page 126-n may be encrypted with the first key prior to being stored to secondary memory 116.

In many embodiments, once the memory page 126-n has been made inaccessible to cryptographic domain 104-1 and/or the page mappings have been invalidated, a new instruction, referred to as PGINVDREMAP, may be used to efficiently reassign keys for memory pages being reallocated from a first cryptographic domain to a second cryptographic domain. In one or more embodiments described herein, the PGINVDREMAP instruction flow may be summarized as follows: (1) send invd_page to all cores to invalidate all cache lines associated with a page being reassigned from an old cryptographic domain; (2) wait for acknowledgement from each of the cores that the invalidation of cache lines associated with the page being reassigned is complete; and (3) non-temporal writes to the entire page with a new key or key identifier associated with a new cryptographic domain the page is being reassigned to reinitialize the integrity values (e.g., MACs) with the new key or key identifier.

In many such embodiments, PGINVDREMAP may invalidate all cache lines in core caches 122 and shared cache 124 associated with memory page 126-n using the first key, or an indication of the first key (e.g., key identifier). In some embodiments, PGINVDREMAP may be an instruction set architecture (ISA) instruction and/or a ring-0 instruction. For instance, PGINVDREMAP may issue a command to each of processing cores 120 to invalidate cache lines associated with the cryptographic domain 104-1. In various embodiments, PGINVDREMAP may also reinitialize integrity values (e.g., MACs) using the second key, which is associated with cryptographic domain 104-2. In various such embodiments, reinitialization of the integrity values may prevent integrity failures when the page is reassigned and used with the second key. In several embodiments, a MAC may be associated with each cache line associated with or on a page. In many embodiments, non-temporal writes may be used for reinitializing integrity values to enable integrity support for VM isolation. In many embodiments, the RMGR 108 may include or utilize hardware and/or software support to implement PGINVDREMAP.

In some embodiments, such as when a VM may execute PGINVDREMAP to initialize its own or assigned memory. In such embodiments, the VM monitor (VMM) may be able to verify/determine one or more of (1) the instruction was executed by the processor; (2) which memory address the PGINVDREMAP was executed against; and (3) which key identifier the memory was initialized to or with. For instance, this could be enabled by the VMM configuring a VM execution control to trigger or a VM exit, or other invocation of the VMM after the PGINVDREMAP instruction was executed by the guest VM. In such instances, the VM control structure (VMCS), or similar, may contain the instruction identifier, address, and key identifier allowing the VMM to read this structure and verify the instruction was executed correctly by the VM as expected by the VMM. In various instances, after verifying correct execution of the instruction the VMM may then resume the VM. In some embodiments, these or similar techniques may be used to enable various usages, such as a secure public cloud usage.

In some embodiments, such as when VM memory is to be kept private from the VMM, a VM may be assigned an exclusive key (or set of keys) and associated key identifiers by the processor or hardware subsystem that only the VM may use while it is executing. In such embodiments, the PGINVDREMAP instruction may be executed by the VM for only the key identifier (or identifiers) which the VM was assigned by the processor or hardware subsystem. Accordingly, if a VM attempts to initialize memory using a key identifier not assigned to it by the processor, attempted execution of PGINVDREMAP may cause a fault, exit, or other error, and reinitialization will fail. PGINVDREMAP will be discussed in more detail below, such as with respect to FIG. 4.

It will be appreciated that one or more keys described herein may refer to a key pair and one or more of the keys may undergo one or more key expansions to enable cryptographic operations. In one embodiment, for instance, before a key can be used for cryptographic operations, such as encrypting or generating MACs, it must be expanded into a larger number of keys. In some such instances the key may be expanded into 11 keys to support multiple rounds of encryption or decryption. In various embodiments, the key may be expanded on the fly during execution. In other embodiments, the keys may be expanded and stored prior to operation. In some embodiments, whether keys are expanded on the fly may be decided based on different performance constraints, such as area/performance tradeoffs.

Figure 2A:
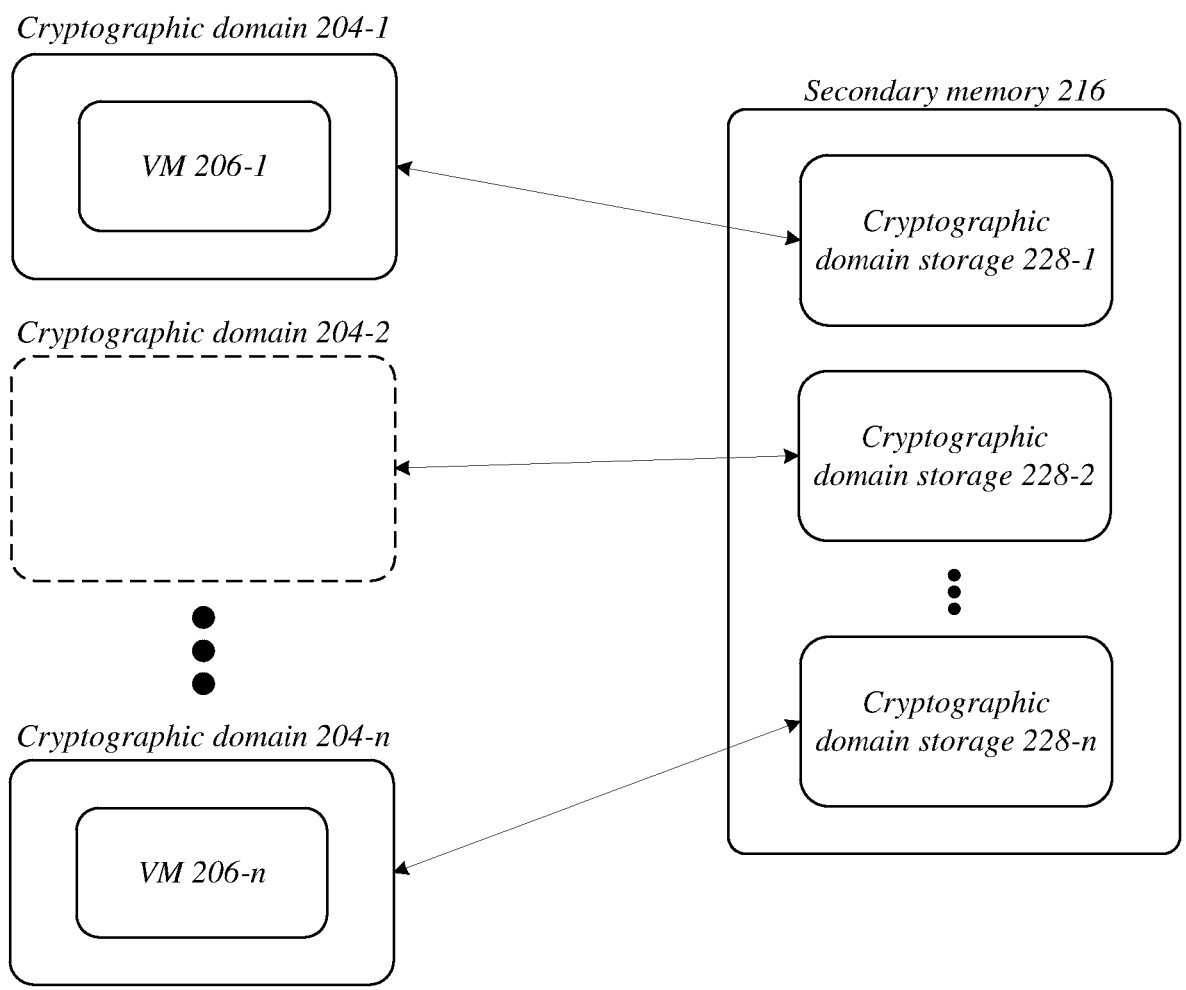
FIG. 2A, FIG. 2B, and FIG. 2C illustrate an embodiment of a first resource utilization among cryptographic domains.
Figure 2B:
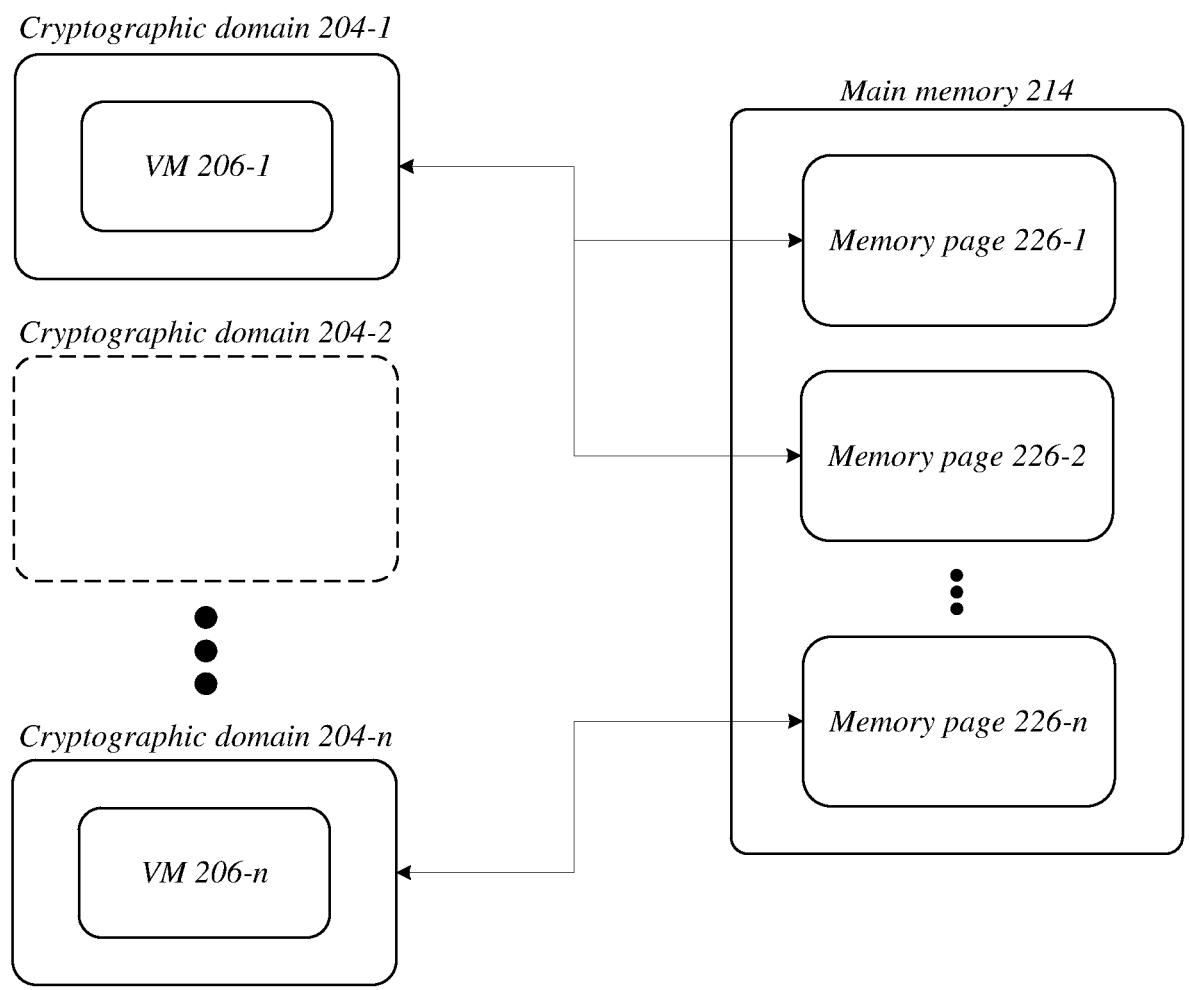
Figure 2C:
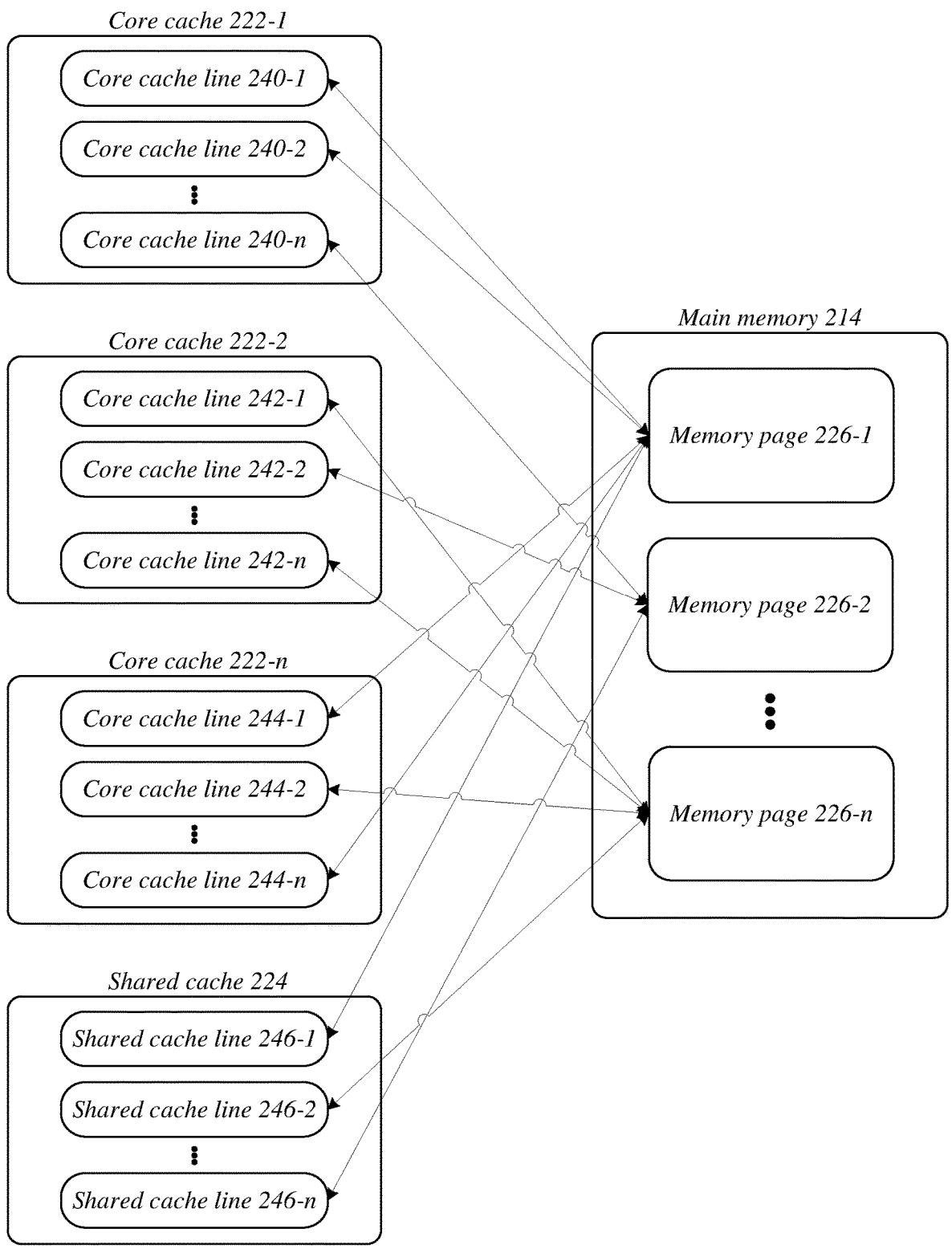
Figure 3A:
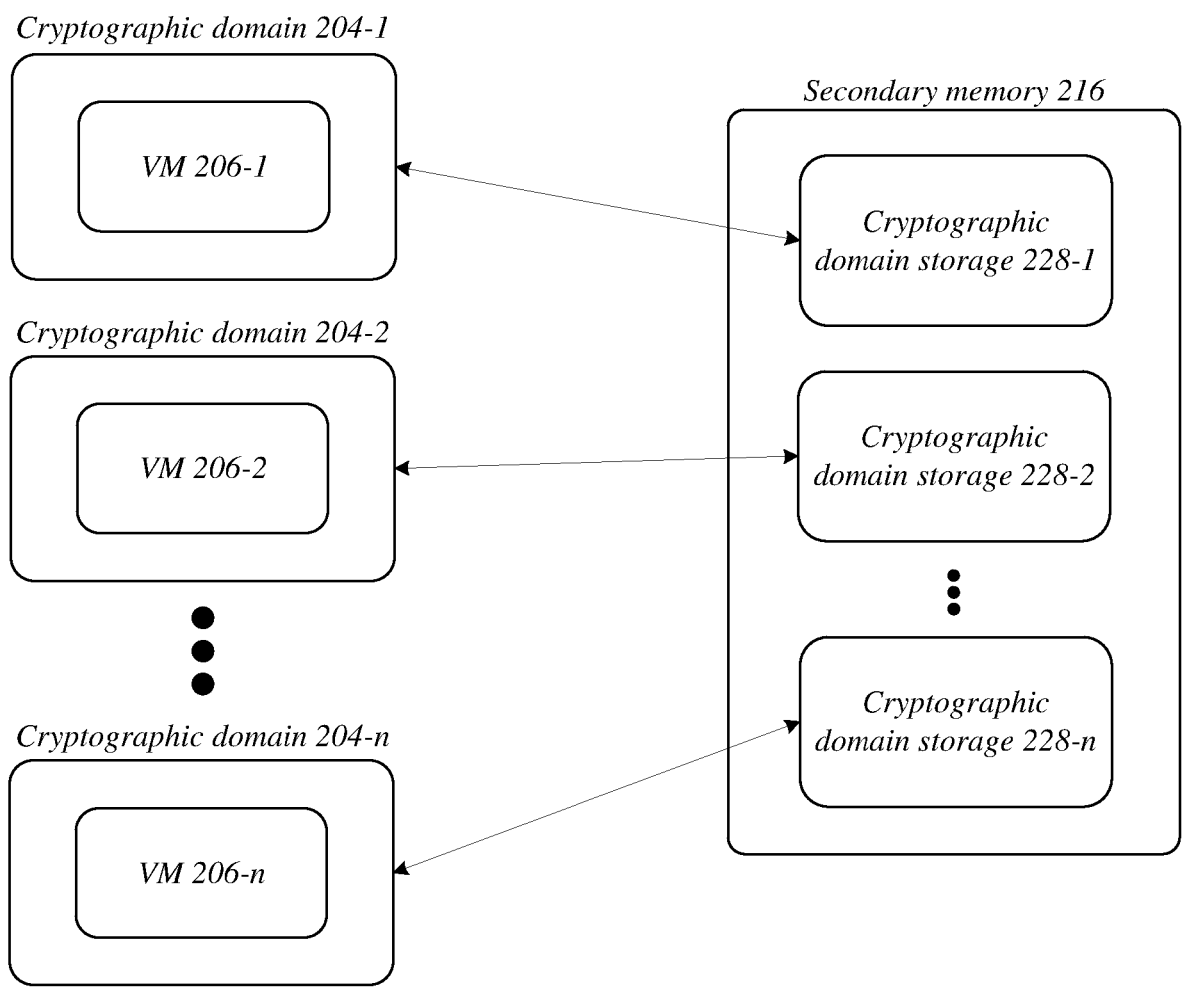
FIG. 3A, FIG. 3B, and FIG. 3C illustrate an embodiment of a second resource utilization among cryptographic domains.
Figure 3B:
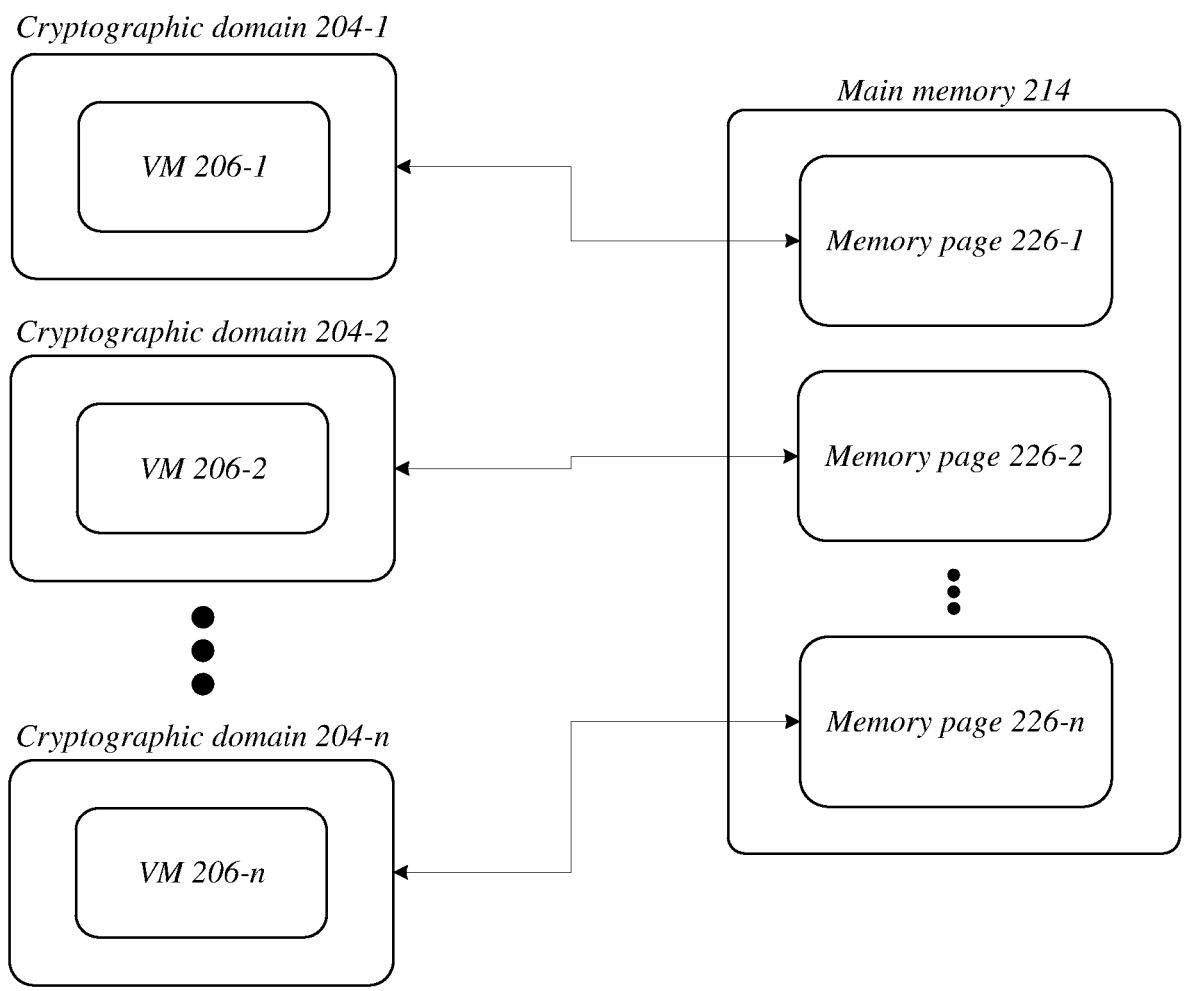
Figure 3C:
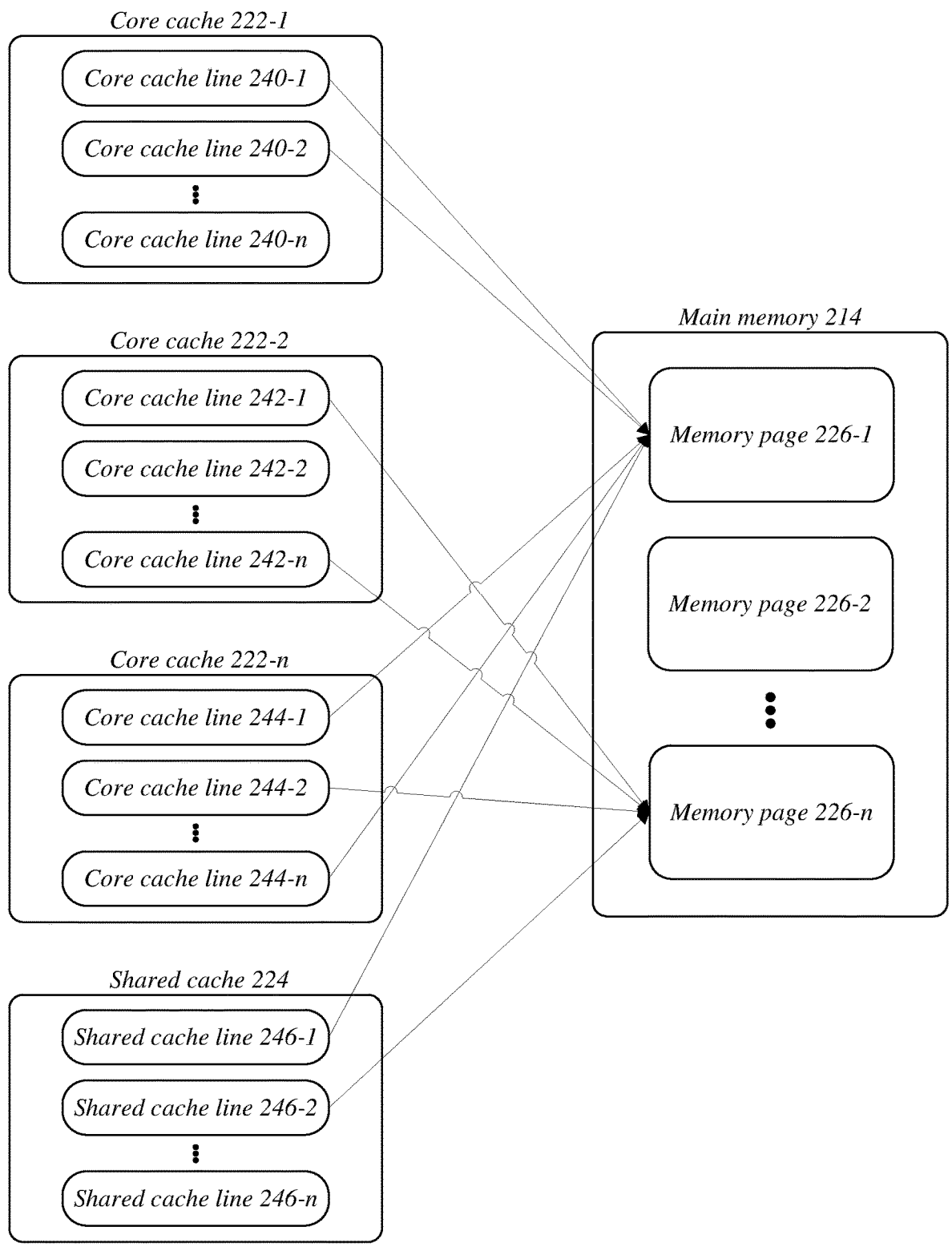

FIG. 2A, FIG. 2B, and FIG. 2C illustrate an example of an operating environment 200 that may be representative of a first resource utilization among cryptographic domains 204. FIG. 3A, FIG. 3B, and FIG. 3C illustrate an example of an operating environment 300 that may be representative of a second resource utilization among cryptographic domains 204. Accordingly, a transition from a first resource allocation that corresponds with the first resource utilization to a second resource allocation that corresponds with the second resource utilization will be described with respect to FIG. 2A, FIG. 2B, and FIG. 2C. In many embodiments, the components of FIG. 2A, FIG. 2B, and FIG. 2C may be the same or similar to the components of FIG. 1A and FIG. 1B. Embodiments are not limited in this context.

In operating environment 200, cryptographic domain 204-1 may be active with instantiated VM 206-1, cryptographic domain 204-2 may be inactive without an instantiated VM, and cryptographic domain 204-n may be active with instantiated VM 206-n. As shown in FIG. 2A, each of the cryptographic domains 204 may utilize a portion of secondary memory 216 for storage of data. For example, cryptographic domain 204-1 may utilize cryptographic domain storage 228-1, cryptographic domain 104-2 may be associated with cryptographic domain storage 228-2, and cryptographic domain 204-n may be associated with cryptographic domain storage 228-n. As shown in FIG. 2B, memory pages 226-1, 226-2 of main memory 214 are allocated to cryptographic domain 204-1, memory page 226-*n* of main memory 214 is allocated to cryptographic domain 204-*n*, and no memory pages are allocated to cryptographic domain 204-2.

In various embodiments, portions of the data stored in a respective cryptographic domain storage of secondary memory 216 may be loaded into memory pages of main memory 214 that are allocated to the cryptographic domain that corresponds to the respective cryptographic domain storage. In various such embodiments, the portions of data may be loaded into memory pages for execution, analysis, and/or manipulation by a processing core (e.g., one or more of processing cores 120). For example, data for cryptographic domain 204-1 may be loaded into memory page 226-1 and/or memory page 226-2 from cryptographic domain storage 228-1.

In various embodiments described herein, the number of memory pages allocated to a cryptographic domain may be based on the amount of data that needs to be readily accessible to processing cores to perform a requested function, such as running a program on an instantiated VM. In some embodiments, data in secondary memory 216 may be encrypted/decrypted with a corresponding domain key as the data is moved to/from the secondary memory. In one or more embodiments, associations between memory and cryptographic domains may be tracked via one or more memory mappings. In one or more such embodiments, the one or more memory mappings may be replaced or revised as part of allocating/reallocating memory to different cryptographic domains.

In many embodiments, data in main memory 214 may be cached in one or more of the core caches 222 and the shared cache 224 as it is utilized by a processing core according to a cache algorithm. In one or more embodiments, caching may be used to improve memory performance by keeping frequently used data in memory with a lower access latency. As shown in FIG. 2C, each of the cache lines in the caches may be associated with the memory page from which its contents came from. In various embodiments, a key identifier associated with the cryptographic domain to which the memory page is allocated may associate a cache line with a memory page. In some embodiments, the key identifier may form a portion of a memory address of the cache line and/or the memory page.

Referring to FIG. 3A, in operating environment 300, cryptographic domain 204-2 may become active and VM 206-2 may be instantiated therein. In many embodiments, to instantiate VM 206-2 in cryptographic domain 204-2, data from cryptographic domain storage 228-2 may need to be loaded into main memory 214. In some embodiments, memory errors caused by memory integrity failures may be indicated by setting a poison bit on erroneous cache lines to indicate there was an error with the associated memory load. As shown in FIG. 3B, to support instantiation of VM 206-2, memory page 226-2 may be reallocated from cryptographic domain 204-1 to cryptographic domain 204-2. In other embodiments, memory page reallocation from a first cryptographic domain to a second cryptographic domain may occur in response to VM teardown in the first cryptographic domain. Reallocation of a memory page from a first cryptographic domain to a second cryptographic domain will be described in more detail below, such as with respect to FIG. 4 and FIG. 5. In various embodiments, reallocating memory page 226-2 from cryptographic domain 204-1 to cryptographic domain 204-2 may include updating a memory mapping.

Referring to FIG. 3C, all cache lines in core caches 222 and shared cache 224 that are associated with the reallocated memory page 226-2 need to be flushed and/or invalidated to ensure function correctness, such as memory errors. For instance, if data stored in core cache line 240-*n* associated with cryptographic domain 204-1 remained after reallocation of memory page 226-2 from cryptographic domain 204-1 to cryptographic domain 204-2, then the data may cause memory errors when evicted from the cache because of its association with cryptographic domain 204-1. Accordingly, cache line 240-*n* of core cache 222-1, cache line 242-2 of core cache 222-2, and shared cache line 246-*n* of shared cache 224 may need to be invalidated and/or disassociated with memory page 226-2. This process will be described in more detail below, such as with respect to FIG. 5.

Figure 4:
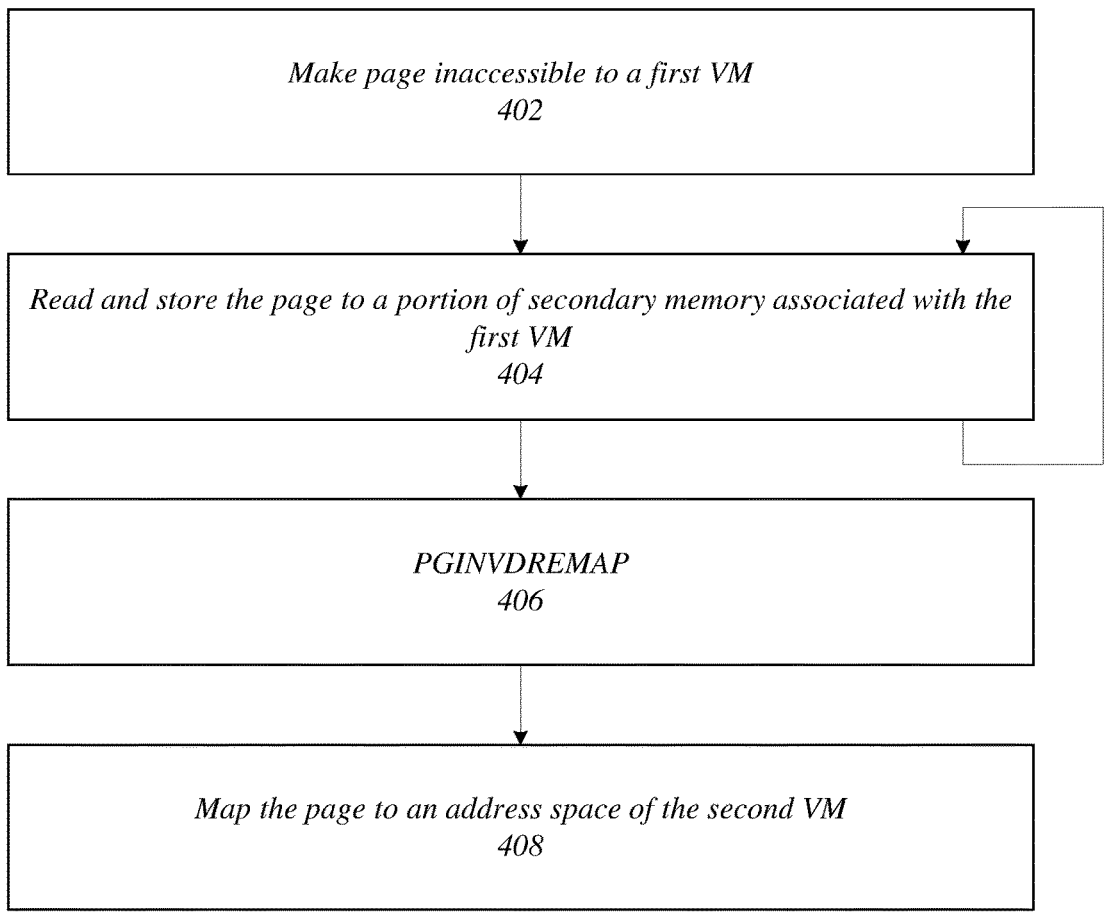
FIG. 4 illustrates an embodiment of a first logic flow.

FIG. 4 illustrates one embodiment of a logic flow 400, which may be representative of operations that may be executed and/or implemented in various embodiments in conjunction with dynamically allocating resource among cryptographic domains. The logic flow 400 may be representative of some or all of the operations that may be executed and/or implemented by one or more components of operating environments 100, 200, 300, such as by RMGR 108 or processing cores 120 (e.g., in executing PGINVDREMAP). The embodiments are not limited in this context.

In the illustrated embodiment shown in FIG. 4, the logic flow 400 may begin at block 402. At block 402 "make page inaccessible to a first VM" the memory page being reassigned may be made inaccessible to a first VM that the memory page is being reassigned from. For example, if memory page 126-*n* is being reassigned from VM 106-1 to VM 106-2, then memory page 126-*n* may be made inaccessible to components of cryptographic domain 104-1. In some embodiments, making a memory page inaccessible to the first VM may include invalidating or updating one or more of memory mappings 115. In some embodiments, invalidating memory mappings may include one or more of invalidating mappings from a translation lookaside buffer, input/output memory management unit (IOMMU) invalidation (e.g., if the page was device accessible), and marking the page as not present in page table structures, such as extended page tables managed by the VMM.

Proceeding to block 404 "read and store the page to a portion of secondary memory associated with the first VM" the memory page may be read and stored to a portion of secondary memory that is associated with the first VM. For example, if cryptographic domain storage 128-1 is associated with the cryptographic domain of the first VM, then the contents of the memory page may be read and stored to cryptographic domain storage 128-1. In various embodiments, the contents of the memory page may be encrypted prior to being stored to cryptographic domain storage 128-1. For instance, the domain key of domain keys 105 that is associated with the cryptographic domain of the first VM may be used to encrypt the contents of the memory page before the contents are stored to cryptographic domain storage 128-1. In some embodiments, block 404 may be repeated until all the contents of the memory page have been stored to cryptographic domain storage 128-1.

At block 406 "PGINVDREMAP" a new instruction referred to as PGINVDREMAP may be executed. In various embodiments described herein, PGINVDREMAP may be a new instruction that combines invalidation of cache lines and integrity value reinitialization operations. In many embodiments, PGINVDREMAP may ensure that the memory page is invalidated from the cache hierarchy using a first key or first key identifier that is associated with the cryptographic domain the memory page is being reassigned from. Additionally, or alternatively, PGINVDREMAP may ensure that integrity values, such as message authentication codes (MACs) are generated using a second key or second key identifier that is associated with the cryptographic domain the memory page is being reassigned to. In one or more embodiments described herein, PGINVDREMAP may operate at the granularity of a memory page. It will be appreciated that in various embodiments an old key or old key identifier may refer to the key or key identifier that is associated with the cryptographic domain the memory page is being reassigned from and a new key or new key identifier may refer to the key or key identifier that is associated with the cryptographic domain the memory page is being reassigned to.

In various embodiments, PGINVDREMAP may be a ring-0 instruction. In many embodiments, PGINVDREMAP may take one or more of the following parameters: (1) the address of the memory page to be reassigned; (2) the old key identifier; (3) the new key identifier; and (4) whether integrity values associated with the page need initialization. In various such embodiments, the address of the memory page to be reassigned may include the linear address of the memory page to be reassigned. In some embodiments, as mentioned above, the initialization of integrity values may be controlled based on an input to the PGINVDREMAP instruction. In some such embodiments, this may enable efficient key re-assignment for a page whether or not memory integrity is utilized. In many embodiments, using these parameters, PGINVDREMAP may issue a command to all cores (e.g., processing cores 120) to invalidate the memory page from their caches (e.g., core caches 122 and shared cache 124). In one or more embodiments, the old key identifier passed as a parameter may be used for invalidation operations. In various embodiments, the new key identifier may then be used by PGINVDREMAP to zero out the memory page. In some embodiments, such as when integrity is enabled, the integrity values (e.g., MACs) for the memory page may be reinitialized with the new key identifier.

In many embodiments, PGINVDREMAP may operate across a single socket. In many such embodiments, if the platform has multiple sockets, software may be included, such as in RMGR 108, to execute the instruction for each socket to achieve desired functionality. In one or more embodiments, software may be included, such as in RMGR 108 to specify the old and new key identifier for the physical page being reassigned. In various embodiments, existing caching components, such as a snoop filter, may be utilized to support page invalidation.

In several embodiments, execution of PGINVDREMAP on a logical processor may result in the broadcast of a single invalidate message to all other cores on the platform in the same socket. For instance, the instruction may send a new message, referred to as invd_page, to each of the cores in the socket over an interconnect (e.g. mesh). In many embodiments, the invd_page message may include the old key identifier and the physical address of the memory page to invalidate. In various embodiments, each core (e.g., processing cores 120), upon receiving the invd_page message may check its local caches for any of the lines belonging to the memory page being reassigned.

In many embodiments, the invd_page message may utilize caching hardware that supports snooping and invalidation of cache lines, such as for coherence. In many such embodiments, the invd_page message utilizes the caching hardware to locate cache lines associated with the memory page. In some embodiments, the lookup for the page cache lines may be done with the old key identifier to find the lines of the memory page when it was used with the VM associated with the old key identifier (i.e. the first VM). The flow for page invalidation with the old key identifier will be described in more detail below, such as with respect to FIG. 5.

In some embodiments, such as when integrity is enabled, the integrity values (e.g., MACs) for the memory page may be reinitialized with the new key identifier once invalidation of the cache lines is complete. In many embodiments described herein, PGINVDREMAP may utilize architecturally guaranteed non-temporal writes for reinitializing integrity values to enable integrity to be supported for VM isolation. In various embodiments, without non-temporal writes, the integrity value associated with a cache line in memory may still correspond to the old key, and a read from the new page with the new key could cause an integrity failure. Accordingly, a non-temporal write may be performed for each of the lines in the page using the new key. In several embodiments, a non-temporal write may comprise a write in which a cache line is written to without reading it from memory. In many embodiments, PGINVDREMAP may not wait for the non-temporal write operations to finish. In many such embodiments, logic may use fencing operations to ensure completion of memory access done by the PGINVDREMAP instruction and/or correct operation.

Referring back to the logic flow 400, once block 406 has completed the logic flow may proceed to block 408. At block 408 "map the page to an address space of the second VM" the memory page may be mapped to an address space of the second VM. For instance, the address space of the second VM may include at least a portion of an address space for the cryptographic domain associated with the second VM. In some embodiments, this may include updating, revising, and/or replacing one or more of memory mappings 115.

Figure 5:
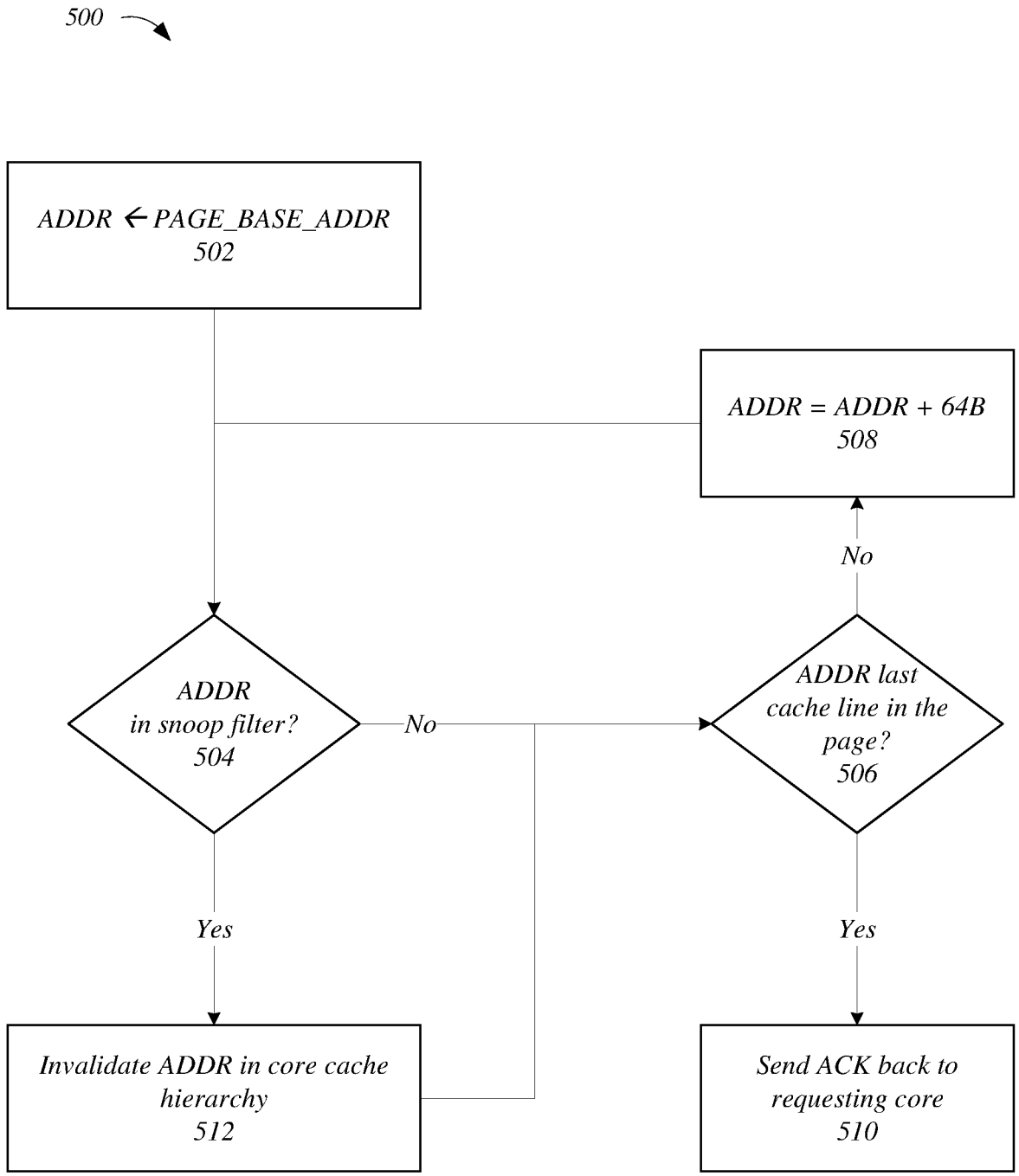
FIG. 5 illustrates an embodiment of a second logic flow.

FIG. 5 illustrates one embodiment of a logic flow 500, which may be representative of operations that may be executed and/or implemented in various embodiments in conjunction with page invalidation during a reallocation of resources from a first cryptographic domain to a second cryptographic domain. Generally, the logic flow 500 may iterate over each line in a page and consult snoop filter hardware to determine whether the line is cached or not, such as in a core cache or a shared cached. The logic flow 500 may be representative of some or all of the operations that may be executed and/or implemented by one or more components of operating environments 100, 200, 300, such as by RMGR 108 or processing cores 120 (e.g., in executing PGINVDREMAP). The embodiments are not limited in this context.

In the illustrated embodiment shown in FIG. 5, the logic flow 500 may begin at block 502. At block 502 "ADDR←PAGE_BASE_ADDR" the page base address is set as the evaluation address. For instance, the page base address may be the physical address of a memory page to invalidate. Continuing to block 504 "ADDR in snoop filter?" it may be determined whether the evaluation address is in the snoop filter. For example, processing core 120-1 may consult snoop filter hardware to determine whether the physical address of memory page 126-1 is in core cache 122-1 and/or at least a portion of shared cache 124. In various embodiments, processing cores 120-2, 120-n may perform similar procedures. In various such embodiments, one or more of the processing cores 120 may perform these procedures in parallel. In many embodiments, snoop filter hardware may maintain information regarding the lines that are cached in a particular core's cache.

If the evaluation address is found in the snoop filter, the logic flow 500 may proceed to block 512. At block 512 "invalidate ADDR in core cache hierarchy" the evaluation address may be invalidated in a core cache hierarchy. For instance, if processing core 120-1 locates the evaluation address in snoop filter hardware, then the processing core 120-1 may invalidate the corresponding cache line in the cache hierarchy comprising core cache 122-1 and shared cache 124. In various embodiments, in addition to issuing the invd_page message in response to identifying an evaluation address in the snoop filter, the page may also be invalidated from a last level cache (LLC). For example, shared cache 124 may be an LLC. In many embodiments, the evaluation address may be invalidated in the LLC by sending invalidation messages for each cache line in the page to the LLC slices where the cache line maps to. In such embodiments, there may be a unique LLC slice to which each cache line can map to using a fixed hashing function in the core). In some embodiments, there may be two or more levels in the cache hierarchy. Next, the logic flow 500 may proceed to block 506 as will be described in more detail below.

Referring back to block 504, if the evaluation address is not found in the snoop filter, the logic flow 500 may proceed to block 506. At block 506 "ADDR last cache line in the page?" it may be determined whether the evaluation address was the last cache line in the page. If the evaluation address is not the last cache line in the page then the logic flow 500 may proceed to block 508. At block 508 "ADDR=ADDR+ 64 B" the evaluation address may be updated to the next cache line. In the illustrated embodiments, each memory line may be 64 B, thus adding 64 B to the previous evaluation address can set a new evaluation address corresponding to a subsequent line in the memory page. Next, the logic flow 500 may return to block 504.

Referring back to block 506, if the evaluation address is the last cache line in the page, then the logic flow 500 may proceed to block 510. At block 510 "send ACK back to requesting core" an acknowledgement message may be sent back to the core requesting the invalidation. In various embodiments, the acknowledgement message may be in response to the invd_page message. For instance, the acknowledgement message may be in response to execution of PGINVDREMAP may a logical processor that results in broadcast of the invd_page message to all other cores in the platform 102 that are on the same socket. In many embodiments, once the requesting core receives acknowledgement messages from all other cores in the socket on invalidation completion, it may be guaranteed that the page with the old key identifier is not cached in the socket on any of the cores.

FIG. 6 illustrates one embodiment of a logic flow 600, which may be representative of operations that may be executed and/or implemented in various embodiments in conjunctions with resource allocation management. The logic flow 600 may be representative of some or all of the operations that may be executed and/or implemented by one or more components of operating environments 100, 200, 300 of FIGS. 1A-3C, such as by RMGR 108 or processing cores 120 (e.g., in executing PGINVDREMAP). The embodiments are not limited in this context.

In the illustrated embodiment shown in FIG. 6, the logic flow 600 may begin at block 602. At block 602 "identify a first key identifier associated with a first virtual machine (VM), a second key identifier associated with a second VM, and an address of a memory page allocated to the first VM" a first key identifier associated with a first VM, a second key identifier associated with a second VM, and an address of a memory page allocated to the first VM may be identified. For example, a key identifier associated with VM 206-1, a key identifier associated with VM 206-2, and an address of memory page 226-2 may be identified. At block 604 "invalidate a cache line associated with the first VM based on the first key identifier" a cache line associated with the first VM may be invalidated based on the first key identifier. For instance, one or more of core cache lines 240-n, 242-2, 246-n may be invalidated based on their associated with the first key identifier.

Continuing to block 606 "generate a message authentication code (MAC) for each cache line comprising the memory page based on the second key identifier" a MAC for each cache line in the memory page may be generated based on the second key identifier. For example, a MAC for memory page 226-2 (i.e., each cache line comprising the memory page 226-2) may be generated based on the key identifier associated with VM 206-2. At block 608 "allocate the memory page to the second VM" the memory page may be allocated to the second VM. For instance, the memory page 226-2 may be allocated to VM 206-2.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flows 400, 500, and 600 of FIG. 4, FIG. 5, and FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
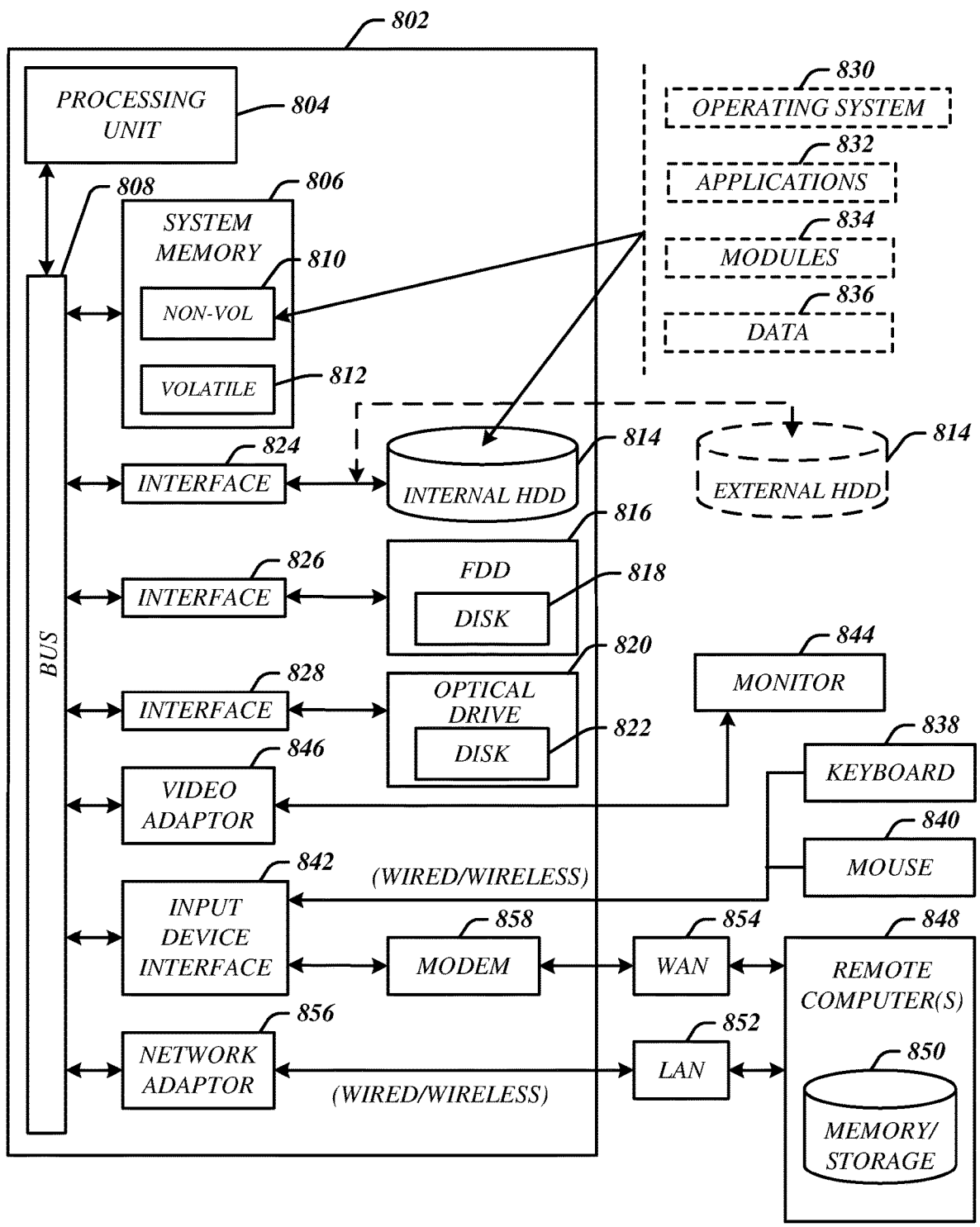
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environments 100, 200, 300 of FIGS. 1A-3C. In some embodiments, computing architecture 800 may be representative, for example, one or more portions of RMGR 108 and/or processing cores 120 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RMGR), dynamic RMGR (DRAM), Double-Data-Rate DRAM (DDRAM), synchronous DRAM (SDRAM), static RMGR (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the RMGR 108 and/or other logic described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
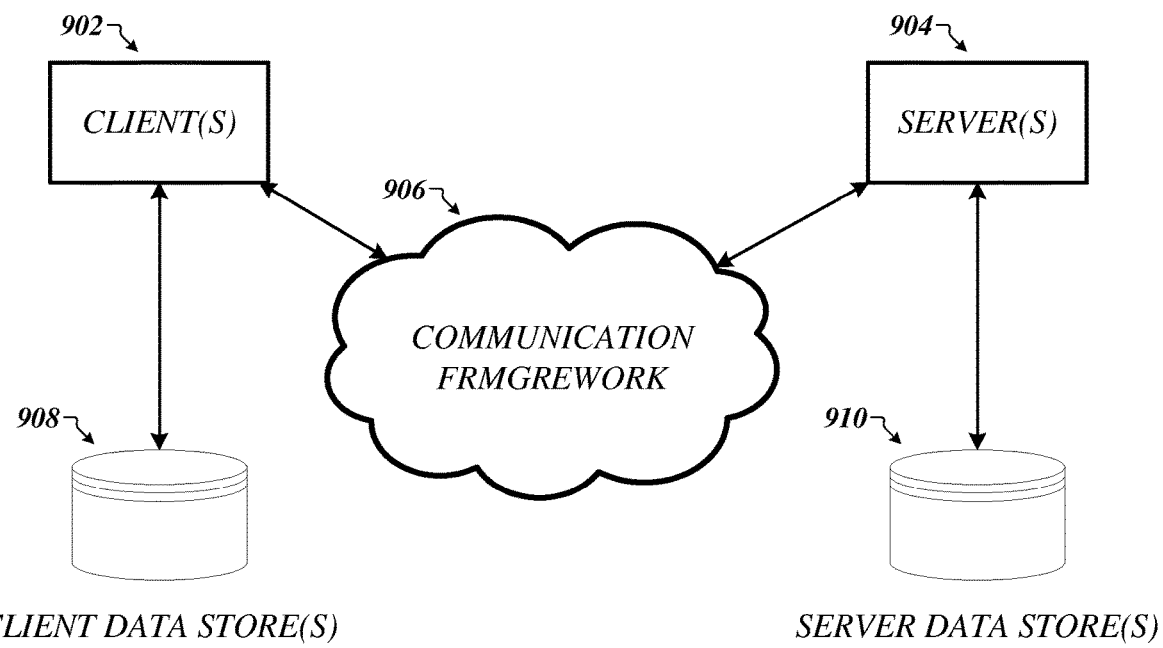
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus for resource allocation management, the apparatus comprising: logic, at least a portion of the logic implemented in circuitry, the logic to: identify a first key identifier associated with a first virtual machine (VM), a second key identifier associated with a second VM, and an address of a memory page allocated to the first VM; invalidate a cache line associated with the first VM based on the first key identifier; generate a message authentication code (MAC) for each cache line comprising the memory page based on the second key identifier; and allocate the memory page to the second VM.

Example 2 includes the subject matter of Example 1, the logic to: invalidate a first mapping of the memory page to the first VM; and generate a second mapping of the memory page to the second VM.

Example 3 includes the subject matter of Example 1, the logic to initialize the MAC for each cache line comprising the memory page with a non-temporal write.

Example 4 includes the subject matter of Example 3, the logic to utilize a fencing operation to ensure correct operation of the non-temporal write.

Example 5 includes the subject matter of Example 3, the non-temporal write to include a write to the cache line without reading the cache line from the memory page.

Example 6 includes the subject matter of Example 3, the non-temporal write architecturally guaranteed.

Example 7 includes the subject matter of Example 1, the logic to identify the cache line to invalidate based on the first key identifier and a snoop filter.

Example 8 includes the subject matter of Example 1, the logic to invalidate the cache line associated with the first VM and generate the MAC for each cache line comprising the memory page in response to execution of a ring-0 instruction or an instruction included in an instruction set architecture (ISA).

Example 9 includes the subject matter of Example 1, the logic to generate a message for a set of processing cores comprising the first key identifier and the address of the memory page, the message to cause the set of processing cores to invalidate cache lines associated with the first VM.

Example 10 includes the subject matter of Example 9, the logic to identify an acknowledgement from each processing core in the set of processing cores, the acknowledgement to indicate cache lines associated with the first VM have been invalidated.

Example 11 includes the subject matter of Example 1, the logic to invalidate a second cache line in a shared cache based on the cache line associated with the first VM mapping to the second cache line in the shared cache.

Example 12 includes the subject matter of Example 11, the shared cache comprising a last level cache (LLC).

Example 13 includes the subject matter of Example 1, the address of the memory page allocated to the first VM comprising a linear address of the memory page.

Example 14 includes the subject matter of Example 1, the cache line associated with the first VM comprised in a core cache.

Example 15 includes the subject matter of Example 1, the memory page comprised in random access memory.

Example 16 includes the subject matter of Example 1, the logic to: identify a key associated with the first VM based on the first key identifier; and generate the MAC for each cache line comprising the memory page with the key.

Example 17 is a method for resource allocation management, the method comprising: identifying a first key identifier associated with a first virtual machine (VM), a second key identifier associated with a second VM, and an address of a memory page allocated to the first VM; invalidating a cache line associated with the first VM based on the first key identifier; generating a message authentication code (MAC) for each cache line comprising the memory page based on the second key identifier; and allocating the memory page to the second VM.

Example 18 includes the subject matter of Example 17, comprising: invalidating a first mapping of the memory page to the first VM; and generating a second mapping of the memory page to the second VM.

Example 19 includes the subject matter of Example 17, comprising initializing the MAC for each cache line comprising the memory page with a non-temporal write.

Example 20 includes the subject matter of Example 19, comprising utilizing a fencing operation to ensure correct operation of the non-temporal write.

Example 21 includes the subject matter of Example 19, the non-temporal write comprising a write to the cache line without reading the cache line from the memory page.

Example 22 includes the subject matter of Example 19, the non-temporal write architecturally guaranteed.

Example 23 includes the subject matter of Example 17, comprising identifying the cache line to invalidate based on the first key identifier and a snoop filter.

Example 24 includes the subject matter of Example 17, comprising invalidating the cache line associated with the first VM and generate the MAC for each cache line comprising the memory page in response to execution of a ring-0 instruction or an instruction included in an instruction set architecture (ISA).

Example 25 includes the subject matter of Example 17, comprising generating a message for a set of processing cores comprising the first key identifier and the address of the memory page, the message to cause the set of processing cores to invalidate cache lines associated with the first VM.

Example 26 includes the subject matter of Example 25, comprising identifying an acknowledgement from each processing core in the set of processing cores, the acknowledgement to indicate cache lines associated with the first VM have been invalidated.

Example 27 includes the subject matter of Example 17, comprising invalidating a second cache line in a shared cache based on the cache line associated with the first VM mapping to the second cache line in the shared cache.

Example 28 includes the subject matter of Example 27, the shared cache comprising a last level cache (LLC).

Example 29 includes the subject matter of Example 17, the address of the memory page allocated to the first VM comprising a linear address of the memory page.

Example 30 includes the subject matter of Example 17, the cache line associated with the first VM comprised in a core cache.

Example 31 includes the subject matter of Example 17, the memory page comprised in random access memory.

Example 32 includes the subject matter of Example 17, comprising: identifying a key associated with the first VM based on the first key identifier; and generating the MAC for each cache line comprising the memory page with the key.

Example 33 is at least one non-transitory computer-readable medium comprising a set of instructions that, in response to being executed by a processor circuit, cause the processor circuit to: identify a first key identifier associated with a first virtual machine (VM), a second key identifier associated with a second VM, and an address of a memory page allocated to the first VM; invalidate a cache line associated with the first VM based on the first key identifier; generate a message authentication code (MAC) for each cache line comprising the memory page based on the second key identifier; and allocate the memory page to the second VM.

Example 34 includes the subject matter of Example 33, comprising instructions that, in response to being executed by the processor circuit, cause the processor circuit to: invalidate a first mapping of the memory page to the first VM; and generate a second mapping of the memory page to the second VM.

Example 35 includes the subject matter of Example 33, comprising instructions that, in response to being executed by the processor circuit, cause the processor circuit to initialize the MAC for each cache line comprising the memory page with a non-temporal write.

Example 36 includes the subject matter of Example 35, comprising instructions that, in response to being executed by the processor circuit, cause the processor circuit to utilize a fencing operation to ensure correct operation of the non-temporal write.

Example 37 includes the subject matter of Example 35, the non-temporal write to include a write to the cache line without reading the cache line from the memory page.

Example 38 includes the subject matter of Example 35, the non-temporal write architecturally guaranteed.

Example 39 includes the subject matter of Example 33, comprising instructions that, in response to being executed by the processor circuit, cause the processor circuit to identify the cache line to invalidate based on the first key identifier and a snoop filter.

Example 40 includes the subject matter of Example 33, comprising instructions that, in response to being executed by the processor circuit, cause the processor circuit to invalidate the cache line associated with the first VM and generate the MAC for each cache line comprising the memory page in response to execution of a ring-0 instruction or an instruction included in an instruction set architecture (ISA).

Example 41 includes the subject matter of Example 33, comprising instructions that, in response to being executed by the processor circuit, cause the processor circuit to generate a message for a set of processing cores comprising the first key identifier and the address of the memory page, the message to cause the set of processing cores to invalidate cache lines associated with the first VM.

Example 42 includes the subject matter of Example 41, comprising instructions that, in response to being executed by the processor circuit, cause the processor circuit to identify an acknowledgement from each processing core in the set of processing cores, the acknowledgement to indicate cache lines associated with the first VM have been invalidated.

Example 43 includes the subject matter of Example 33, comprising instructions that, in response to being executed by the processor circuit, cause the processor circuit to invalidate a second cache line in a shared cache based on the cache line associated with the first VM mapping to the second cache line in the shared cache.

Example 44 includes the subject matter of Example 43, the shared cache comprising a last level cache (LLC).

Example 45 includes the subject matter of Example 33, the address of the memory page allocated to the first VM comprising a linear address of the memory page.

Example 46 includes the subject matter of Example 33, the cache line associated with the first VM comprised in a core cache.

Example 47 includes the subject matter of Example 33, the memory page comprised in random access memory.

Example 48 includes the subject matter of Example 33, comprising instructions that, in response to being executed by the processor circuit, cause the processor circuit to: identify a key associated with the first VM based on the first key identifier; and generate the MAC for each cache line comprising the memory page with the key.

Example 49 is an apparatus for resource allocation management, the apparatus comprising: means for identifying a first key identifier associated with a first virtual machine (VM), a second key identifier associated with a second VM, and an address of a memory page allocated to the first VM; means for invalidating a cache line associated with the first VM based on the first key identifier; means for generating a message authentication code (MAC) for each cache line comprising the memory page based on the second key identifier; and means for allocating the memory page to the second VM.

Example 50 includes the subject matter of Example 49, comprising: means for invalidating a first mapping of the memory page to the first VM; and means for generating a second mapping of the memory page to the second VM.

Example 51 includes the subject matter of Example 49, comprising means for initializing the MAC for each cache line comprising the memory page with a non-temporal write.

Example 52 includes the subject matter of Example 51, comprising means for utilizing a fencing operation to ensure correct operation of the non-temporal write.

Example 53 includes the subject matter of Example 51, the non-temporal write comprising a write to the cache line without reading the cache line from the memory page.

Example 54 includes the subject matter of Example 51, the non-temporal write architecturally guaranteed.

Example 55 includes the subject matter of Example 49, comprising means for identifying the cache line to invalidate based on the first key identifier and a snoop filter.

Example 56 includes the subject matter of Example 49, comprising means for invalidating the cache line associated with the first VM and generate the MAC for each cache line comprising the memory page in response to execution of a ring-0 instruction or an instruction included in an instruction set architecture (ISA).

Example 57 includes the subject matter of Example 49, comprising means for generating a message for a set of processing cores comprising the first key identifier and the address of the memory page, the message to cause the set of processing cores to invalidate cache lines associated with the first VM.

Example 58 includes the subject matter of Example 57, comprising means for identifying an acknowledgement from each processing core in the set of processing cores, the acknowledgement to indicate cache lines associated with the first VM have been invalidated.

Example 59 includes the subject matter of Example 49, comprising means for invalidating a second cache line in a shared cache based on the cache line associated with the first VM mapping to the second cache line in the shared cache.

Example 60 includes the subject matter of Example 59, the shared cache comprising a last level cache (LLC).

Example 61 includes the subject matter of Example 49, the address of the memory page allocated to the first VM comprising a linear address of the memory page.

Example 62 includes the subject matter of Example 49, the cache line associated with the first VM comprised in a core cache.

Example 63 includes the subject matter of Example 49, the memory page comprised in random access memory.

Example 64 includes the subject matter of Example 49, comprising: means for identifying a key associated with the first VM based on the first key identifier; and means for generating the MAC for each cache line comprising the memory page with the key.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus for resource allocation management, the apparatus comprising:
    logic, at least a portion of the logic implemented in circuitry, the logic to:
    identify a first key identifier associated with a first virtual machine (VM), a second key identifier associated with a second VM, and an address of a memory page allocated to the first VM;
    invalidate a cache line associated with the first VM based on the first key identifier;
    identify a key associated with the first VM based on the first key identifier;
    generate a message authentication code (MAC) for each cache line comprising the memory page with the key based on the second key identifier; and
    allocate the memory page to the second VM.

2. The apparatus of claim 1, the logic to:
    invalidate a first mapping of the memory page to the first VM; and
    generate a second mapping of the memory page to the second VM.

3. The apparatus of claim 1, the logic to initialize the MAC for each cache line comprising the memory page with a non-temporal write.

4. The apparatus of claim 3, the logic to utilize a fencing operation to ensure correct operation of the non-temporal write.

5. The apparatus of claim 3, the non-temporal write to include a write to the cache line without reading the cache line from the memory page.

6. The apparatus of claim 3, the non-temporal write architecturally guaranteed.

7. The apparatus of claim 1, the logic to identify the cache line to invalidate based on the first key identifier and a snoop filter.

8. The apparatus of claim 1, the logic to invalidate the cache line associated with the first VM and generate the MAC for each cache line comprising the memory page in response to execution of a ring-0 instruction of an instructions included in an instruction set architecture (ISA).

9. The apparatus of claim 1, the logic to generate a message for a set of processing cores comprising the first key identifier and the address of the memory page, the message to cause the set of processing cores to invalidate cache lines associated with the first VM.

10. The apparatus of claim 9, the logic to identify an acknowledgement from each processing core in the set of processing cores, the acknowledgement to indicate cache lines associated with the first VM have been invalidated.

11. The apparatus of claim 1, the logic to invalidate a second cache line in a shared cache based on the cache line associated with the first VM mapping to the second cache line in the shared cache.

12. The apparatus of claim 11, the shared cache comprising a last level cache (LLC).

13. The apparatus of claim 1, the address of the memory page allocated to the first VM comprising a linear address of the memory page.

14. The apparatus of claim 1, the cache line associated with the first VM comprised in a core cache.

15. The apparatus of claim 1, the memory page comprised in random access memory.

16. A method for resource allocation management, the method comprising:
    identifying a first key identifier associated with a first virtual machine (VM), a second key identifier associated with a second VM, and an address of a memory page allocated to the first VM;
    invalidating a cache line associated with the first VM based on the first key identifier;

identifying a key associated with the first VM based on the first key identifier;

generating a message authentication code (MAC) for each cache line comprising the memory page with the key based on the second key identifier; and allocating the memory page to the second VM.

17. The method of claim 16, comprising:

invalidating a first mapping of the memory page to the first VM; and generating a second mapping of the memory page to the second VM.

18. The method of claim 16, comprising initializing the MAC for each cache line comprising the memory page with a non-temporal write.

19. The method of claim 18, comprising utilizing a fencing operation to ensure correct operation of the non-temporal write.

20. The method of claim 18, the non-temporal write comprising a write to the cache line without reading the cache line from the memory page.

21. At least one non-transitory computer-readable medium comprising a set of instructions that, in response to being executed by a processor circuit, cause the processor circuit to:

identify a first key identifier associated with a first virtual machine (VM), a second key identifier associated with a second VM, and an address of a memory page allocated to the first VM;

invalidate a cache line associated with the first VM based on the first key identifier;

identify a key associated with the first VM based on the first key identifier;

generate a message authentication code (MAC) for each cache line comprising the memory page with the key based on the second key identifier; and allocate the memory page to the second VM.

22. The at least one non-transitory computer-readable medium of claim 21, comprising instructions that, in response to being executed by the processor circuit, cause the processor circuit to:

invalidate a first mapping of the memory page to the first VM; and generate a second mapping of the memory page to the second VM.

23. The at least one non-transitory computer-readable medium of claim 21, comprising instructions that, in response to being executed by the processor circuit, cause the processor circuit to initialize the MAC for each cache line comprising the memory page with a non-temporal write.

24. The at least one non-transitory computer-readable medium of claim 23, comprising instructions that, in response to being executed by the processor circuit, cause the processor circuit to utilize a fencing operation to ensure correct operation of the non-temporal write.

* * * * *